United States Patent [19]

DiRisio

[11] Patent Number: 5,418,587

[45] Date of Patent: May 23, 1995

[54] CAMERA WITH DEPLOYABLE CARTRIDGE RECEIVING CHAMBER

[75] Inventor: Anthony DiRisio, Rochester, N.Y.

[73] Assignee: Eastman Kodak Company, Rochester, N.Y.

[21] Appl. No.: 253,891

[22] Filed: Jun. 3, 1994

[51] Int. Cl.⁶ .............................................. G03B 17/02
[52] U.S. Cl. .................................... 354/174; 354/288
[58] Field of Search ............................... 354/288, 174

[56] References Cited

U.S. PATENT DOCUMENTS

| | | | |
|---|---|---|---|
| 2,537,883 | 1/1951 | Ernisse | 354/212 |
| 4,363,547 | 12/1982 | Hashimoto et al. | 354/212 |
| 5,105,211 | 4/1992 | Kameyama | 354/174 X |
| 5,159,365 | 10/1992 | Takahashi et al. | 354/21 |

FOREIGN PATENT DOCUMENTS

| | | |
|---|---|---|
| 1286891 | 1/1969 | Germany . |
| 2-96735 | 4/1990 | Japan . |

Primary Examiner—M. L. Gellner
Assistant Examiner—J. K. Han
Attorney, Agent, or Firm—Roger A. Fields

[57] ABSTRACT

A camera has a deployable cartridge receiving chamber that is supported for opening movement unidirectionally about one pivot and bidirectionally about another pivot point.

2 Claims, 4 Drawing Sheets

CAMERA WITH DEPLOYABLE CARTRIDGE RECEIVING CHAMBER

FIELD OF THE INVENTION

The invention relates generally to the field of photographic cameras, and particularly to a camera with a deployable cartridge receiving chamber.

BACKGROUND OF THE INVENTION

One method taught by the prior art to load a camera involves first placing a cartridge that contains a filmstrip and a protruding film leader in a chamber and then threading the leader end onto a take-up spool. Typically, the take-up spool has a gear driven mechanism that engages initial sprocket holes in the leader. Some people have difficulty loading the camera. As a result, a camera was developed that utilizes a threadless cartridge. An example of a threadless cartridge is Kodak 126 film cartridge. This is relatively large because it has a take-up spool and a take-up chamber.

Other types of cartridges that contain filmstrips have been developed. Some of the cartridges do not contain take-up chambers and take-up spools. One cartridge contains an internal mechanism to thrust the film leader out of the cartridge. This cartridge can be placed in a camera by a procedure called "shot-gun loading." The shot-gun loading procedure involves opening a film door covering a chamber in the camera, and simply dropping the cartridge into the chamber.

A camera that utilizes shot-gun loading may require the camera to be turned up side down in order for the cartridge to be loaded into the camera. This is considered to be cumbersome.

Another method of shod-gun loading a camera is called "four bin loading". Flour bin loading permits a photographer to load and unload a cartridge without turning the camera upside down. See U.S. Pat. Nos. 5,105,211, issued Apr. 14, 1992, and 4,363,547, issued Dec. 14, 1982.

SUMMARY OF THE INVENTION

The present invention overcomes the disadvantages of the prior art by providing a small, compact camera flour bin that may be easily opened to load and unload a cartridge.

ADVANTAGEOUS EFFECTS OF THE INVENTION

One of the advantages of this invention is that the flour bin does not require a translating mechanism. Thus, the active light lock driver and linkages, the spindle and gear train do not have to move. Hence, a simple smaller mechanism may be utilized in the camera.

Another advantage of this invention is that the camera containing the flour bin of this invention may be smaller and more compact.

An additional advantage of this invention is that a translating flour bin does not have to have a visible door hinge on the exterior of the camera body.

The foregoing is accomplished by a camera having a deployable cartridge receiving chamber. The chamber is supported for opening movement unidirectionally about one pivot and bidirectionally about another pivot point.

DESCRIPTION OF THE PREFERRED EMBODIMENTS

Figure 1:
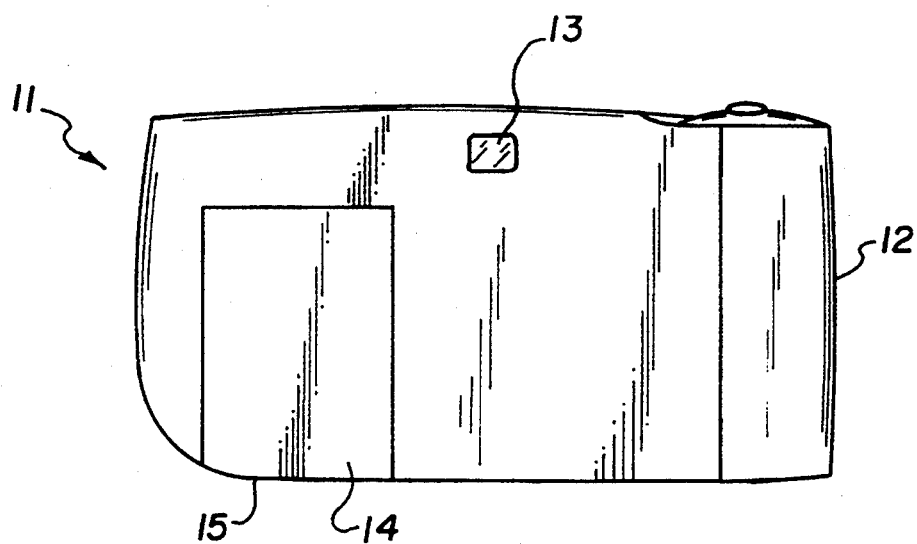
FIG. 1 is a drawing of a back view of a camera.

Referring now to the drawings in detail, and more particularly to FIG. 1, the reference character 11 represents a camera that has a camera body 12. A viewfinder 13 and flour bin panel 14 form a portion of camera body 12.

Figure 2:
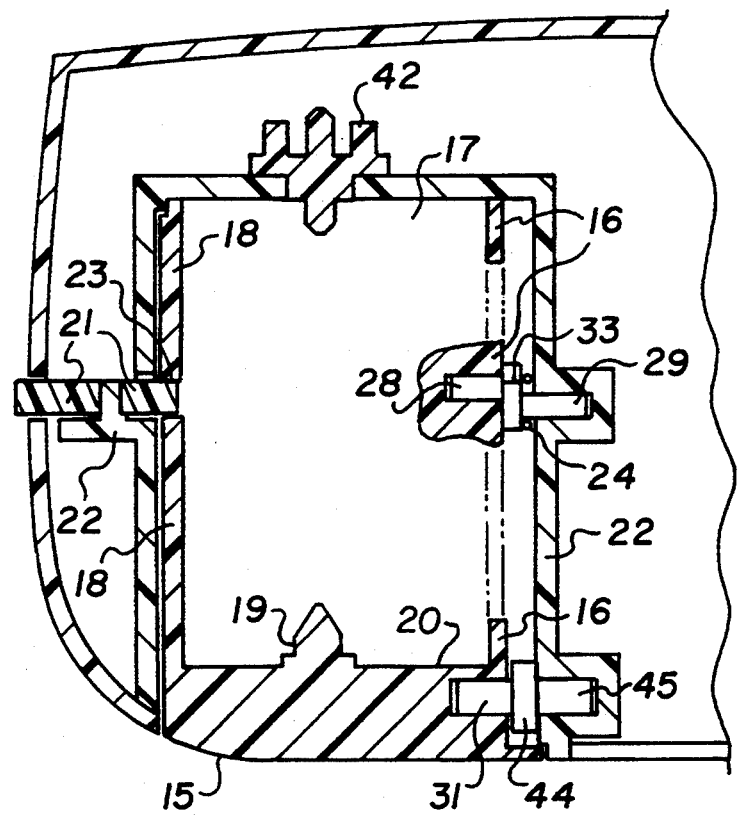
FIG. 2 is a drawing of a cross section of the flour bin of the camera shown in FIG. 1.

FIG. 2 is a drawing of a cross section of the flour bin of the camera shown in FIG. 1. Flour bin panel 14 (shown in FIG. 1) forms a portion of camera body 12 (shown in FIG. 1). Flour bin 15 includes a chamber wall 16, a back wall 17, a panel 14 and a latch side wall 18. A cartridge locator 19 is affixed to flour bin chamber bottom 20. Door latching mechanism 21 is affixed to camera frame 22. Mechanism 21 has the ability to engage latch 23, when mechanism 21 is rotated to open flour bin panel 14. A bin deployment spring 24 is attached to guide lever 33. Guide lever 25 is affixed to frame 22. Guide lever 25 has a bearing post 28 that attaches to chamber wall 16 and a bearing post 29 that attaches to frame 22. Flour bin 15 pivots about bearing post 31 on pivot lever 44 and guide lever 33 pivots about bearing post 29 in frame wall 22.

Figure 3:
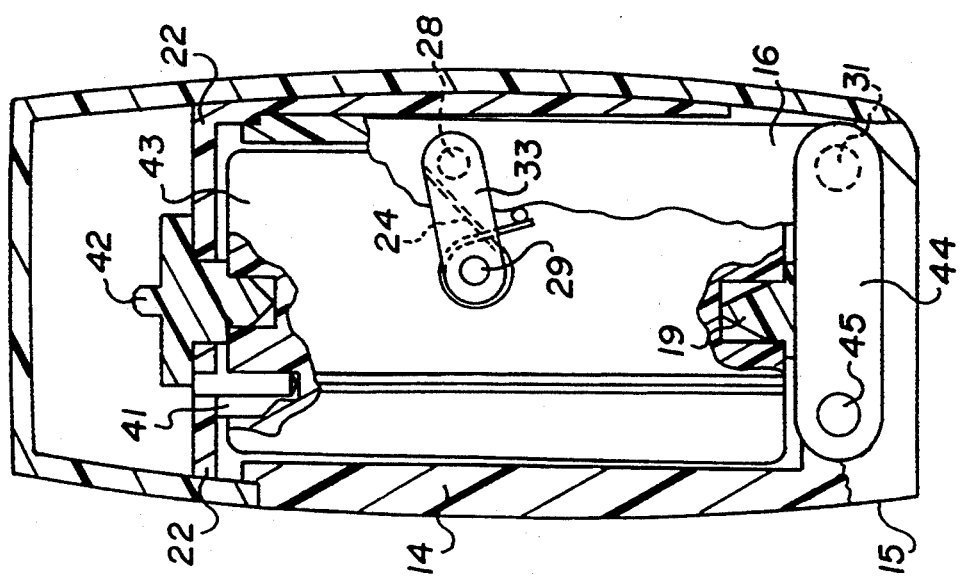
FIG. 3 is a drawing of a side view cross section of the flour bin in a closed position with the active light lock driver and drive spindle engaged in the film cartridge.

FIG. 3 is a drawing of a side view cross section of flour bin 15 in its closed position with active light lock driver 41 and drive spindle 42 engaged into cartridge 43. When the door latch mechanism 21 (described in the description of FIG. 2) is actuated flour bin 15 is allowed to be moved by the bin deployment spring 24 rotating the guide lever 33 clockwise about its frame mounting bearing post 29 driving the flour bin down threw its connection at bearing point 28. The downward motion of the flour bin causes the pivot lever 44 to rotate about its mounting bearing 45 in the camera frame 22 allowing the flour bin pivot point bearing 31 to translate down.

Figure 4:
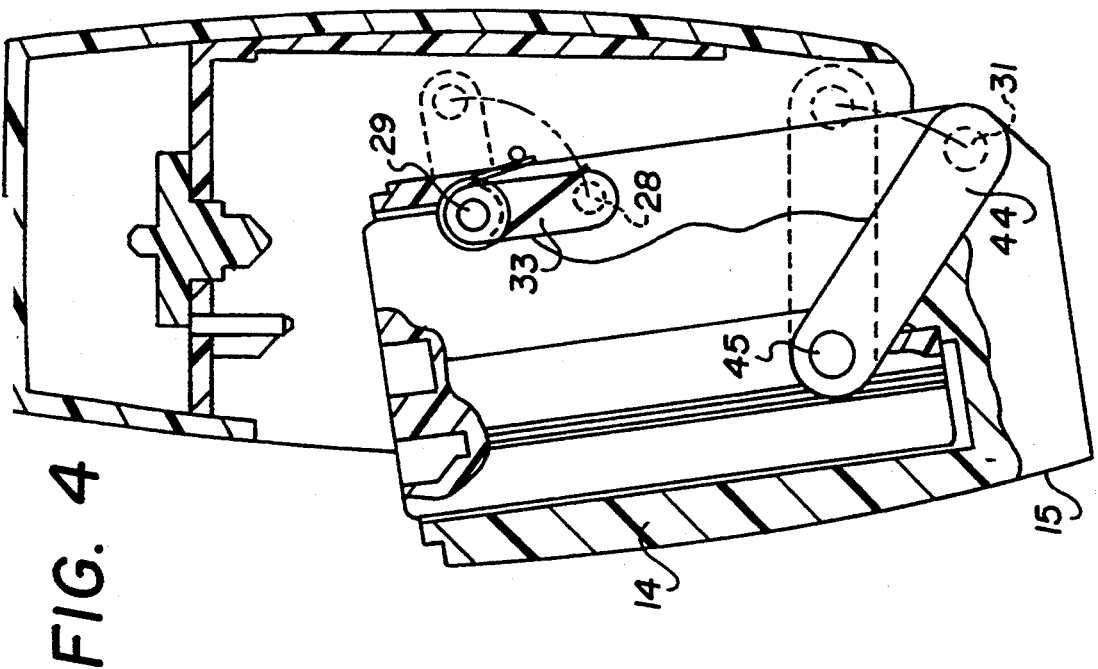
FIG. 4 is a drawing of a partially open flour bin at its fullest down translation point.

FIG. 4 is a drawing of the flour bin 15 in the partial open position. Guide lever 33 rotated to the position where the flour bin pivot point 31 is at its maximum translation downward. As the guide lever 33 continues to rotate the flour bin 15 rotates outward and the bin pivot point 31 translates upward to its film loading position as shown in the description of FIG. 5.

Figure 5:
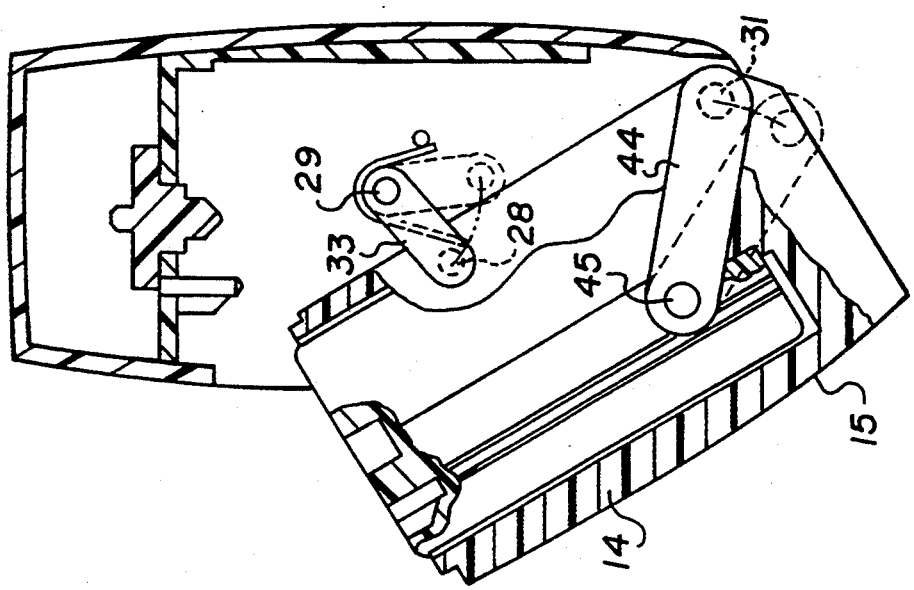
FIG. 5 is a drawing of the flour bin in the full open or film loading position.

FIG. 5 is a drawing of the flour bin 15 in the full open or film loading position. Closing flour bin 15 requires a force generated by a thumb or hand, etc. causing bin 15 to rotate closed and translate up until the flour bin 15 is secured by door latch mechanism 21.

Figure 6:
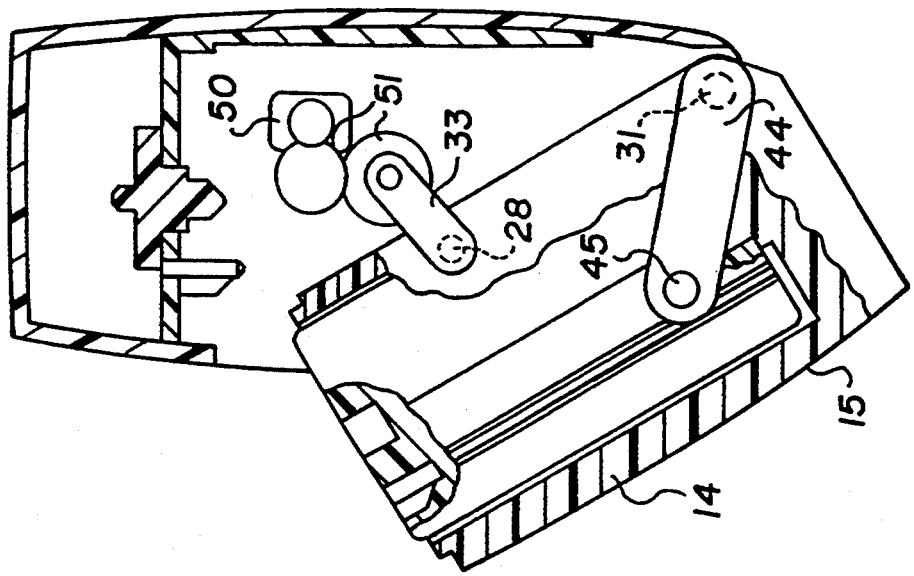
FIG. 6 is a drawing of an alternate embodiment of this invention.

FIG. 6 is a drawing of an alternate embodiment of this invention in which the bin deployment spring 24 is removed and replaced with motor 50 and gear train 51. Motor 50 is attached to gear train 51 to drive guide lever 33 for motorized opening and closing of flour bin 15. Motor 50 may be any motor known in the art i.e., a D.C. motor. Motor 50 receives power from a battery (not shown).

Figure 7:
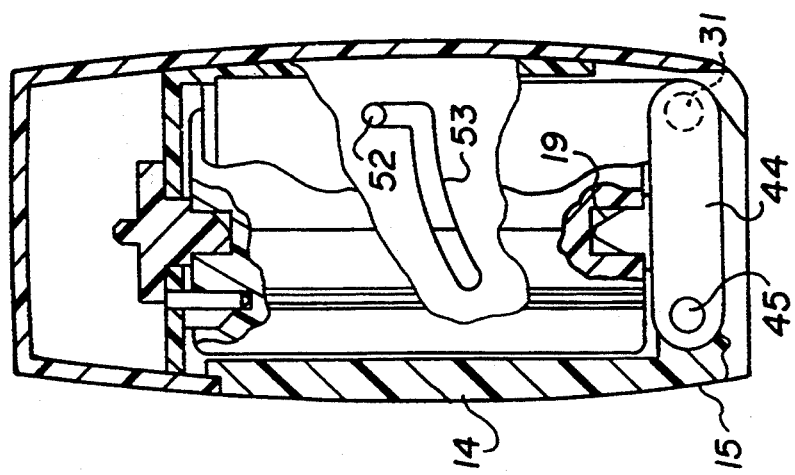
FIG. 7 is a drawing of an alternate embodiment of the invention shown in FIG. 6.

FIG. 7 is a drawing of an alternate embodiment of the invention shown in FIG. 3, showing flour bin 15 in a closed position. The guide lever 33 was replaced with a guide pin 52, on wall 16 of the flour bin 15, that follows a guide slot 53 on frame 22 so that flour bin 15 may translate downward before rotating outward.

Figure 8:
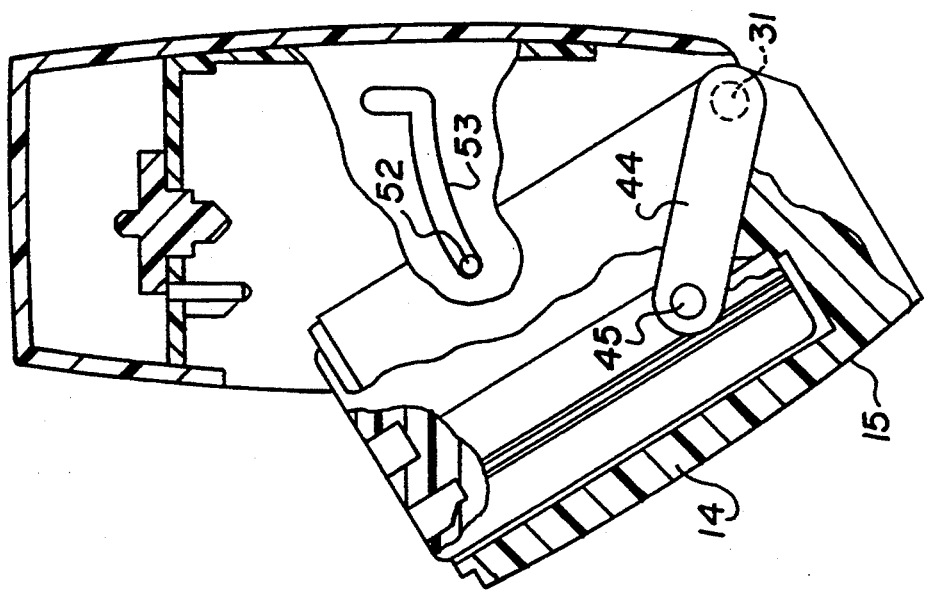
FIG. 8 is a drawing of an alternate embodiment of the invention shown in FIG. 6, showing flour bin 15 in a closed position.

FIG. 8 is a drawing of the embodiment of the invention shown in FIG. 7, showing flour bin 15 in a open or film loading position.

The above specification describes a new and improved translating camera flour bin in which the pivot point of the flour bin translates as the flour bin rotates open. It is realized that the above description may indicate to those skilled in the art additional ways in which the principals of this invention may be used without departing from the spirit. It is, therefore, intended that this invention be limited only by the scope of the appended claims.

Parts List
camera 11
camera body 12
viewfinder 13
flour bin panel 14
flour bin 15
chamber wall 16
back wall 17
latch side wall 18
cartridge locator 19
chamber bottom 20
door latch mechanism 21
camera frame 22
latch 23
bin deployment spring 24
bearing post 28
bearing post 29
bearing post 31
guide lever 33
active light lock 41
drive spindle 42
cartridge 43
pivot lever 44
mounting bearing 45
motor 50
gear train 51
guide pin 52
guide slot 53

What is claimed is:

1. A camera comprising a deployable cartridge receiving chamber, is characterized in that:
    said cartridge receiving chamber is supported for opening movement unidirectionally about one pivot and bidirectionally about another pivot point.

2. A camera comprising a deployable cartridge receiving chamber, is characterized in that:
    said cartridge receiving chamber is supported for combined opening movement unidirectionally about one pivot and bidirectionally about another pivot point simultaneously.

* * * * *